(12) United States Patent
Fan et al.

(10) Patent No.: US 9,042,279 B2
(45) Date of Patent: May 26, 2015

(54) USER EQUIPMENT WITH REDUCED POWER CONSUMPTION OPERATIONAL MODES

(71) Applicants: Lin Fan, Beijing (CN); Yuan Zhu, Beijing (CN); Seunghee Han, Anyangshi (KR); Alexei Davydov, Nizhny Novgorod (RU); Elmar Wagner, Neubiberg (DE)

(72) Inventors: Lin Fan, Beijing (CN); Yuan Zhu, Beijing (CN); Seunghee Han, Anyangshi (KR); Alexei Davydov, Nizhny Novgorod (RU); Elmar Wagner, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/126,723

(22) PCT Filed: Sep. 27, 2013

(86) PCT No.: PCT/US2013/062228
§ 371 (c)(1),
(2) Date: Dec. 16, 2013

(87) PCT Pub. No.: WO2014/130093
PCT Pub. Date: Aug. 28, 2014

(65) Prior Publication Data
US 2014/0269459 A1    Sep. 18, 2014

Related U.S. Application Data

(60) Provisional application No. 61/768,330, filed on Feb. 22, 2013.

(51) Int. Cl.
*H04L 5/14*         (2006.01)
*H04W 48/18*    (2009.01)
*H04W 72/04*    (2009.01)
*H04W 74/02*    (2009.01)
*H04W 28/02*    (2009.01)
(Continued)

(52) U.S. Cl.
CPC .......... *H04W 48/18* (2013.01); *H04W 72/0413* (2013.01); *H04W 74/02* (2013.01); *H04W 28/02* (2013.01); *H04W 40/02* (2013.01); *H04W 88/06* (2013.01); *H04L 45/30* (2013.01); *H04W 8/005* (2013.01); *Y02B 60/50* (2013.01)

(58) Field of Classification Search
CPC ........................................ H04W 52/02–52/028
See application file for complete search history.

(56) References Cited

U.S. PATENT DOCUMENTS

2010/0323647 A1   12/2010   Ryu et al.
2011/0053657 A1   3/2011    Ji
(Continued)

OTHER PUBLICATIONS

Kim, et al.,"Advanced Power Management Techniques in Next-Generation Wireless Networks", Topics in Wireless Communications, IEEE Communications Magazine, May 2010, pp. 94-102.
(Continued)

*Primary Examiner* — Chi H Pham
*Assistant Examiner* — Fahmida Chowdhury
(74) *Attorney, Agent, or Firm* — Stoel Rives LLP

(57) ABSTRACT

A user equipment (UE) power-cycles UE transmission modem components to reduce overall UE power consumption. For example, multiple HARQ ACK/NACK feedback bits are aggregated for a predetermined number of consecutive DL subframes, and then the feedback is transmitted in a single dedicated UL subframe so that a transmitter and power amplifier may be temporarily turned off (State 3) to reduce power consumption in the UE.

6 Claims, 4 Drawing Sheets

(51) Int. Cl.
  *H04W 88/06* (2009.01)
  *H04W 8/00* (2009.01)
  *H04W 40/02* (2009.01)
  *H04L 12/725* (2013.01)

(56) References Cited

U.S. PATENT DOCUMENTS

2012/0106407 A1* 5/2012 Papasakellariou et al. ... 370/280

2013/0044674 A1* 2/2013 Teyeb et al. ................... 370/315
2014/0254452 A1* 9/2014 Golitschek Edler Von Elbwart
 et al. ............................ 370/311

OTHER PUBLICATIONS

International Searching Authority, International Search Report and Written Opinion received for PCT Patent Application No. PCT/US2013/062228, mailed on Dec. 31, 2013, 9 Pages.

* cited by examiner

USER EQUIPMENT WITH REDUCED POWER CONSUMPTION OPERATIONAL MODES

RELATED APPLICATIONS

This application claims priority benefit of U.S. provisional patent application No. 61/768,330, filed Feb. 22, 2013, which is hereby incorporated herein in its entirety.

TECHNICAL FIELD

Embodiments of the present disclosure relate generally to user equipment (UE) for wireless communications and, more particularly, to UE for wireless communications in wireless networks such as evolved universal terrestrial radio access (E-UTRA) networks (EUTRANs) operating in accordance with third-generation partnership project (3GPP) long term evolution (LTE) network standards.

BACKGROUND INFORMATION

In conventional 3GPP LTE systems, downlink hybrid automatic repeat request (HARQ) feedback information for each downlink (DL) subframe is provided to an evolved Node B (eNB) in corresponding separate uplink (UL) subframes. For example, in frequency-division duplexing (FDD) wireless communications, a UE transmits separate UL subframes, each of which carry HARQ acknowledgement (ACK) or negative acknowledgement (NACK) feedback information for corresponding individual DL subframes. The separate UL subframes carrying the HARQ ACK or NACK feedback (collectively and alternatively referred to as HARQ ACK/NACK) are each offset from the corresponding DL subframes according to a predefined fixed relationship.

FIG. 1 illustrates an example timing diagram of the aforementioned HARQ feedback that is defined in 3GPP technical specification (TS) number 36.213 (3GPP TS 36.213). This definition has remained unchanged since LTE release version number eight (LTE Rel. 8). As shown in FIG. 1, if a UE receives a physical downlink shared channel (PDSCH) "a" in subframe index N, the UE then transmits HARQ ACK/NACK information bits for "a" in UL subframe index N+4. Similarly, HARQ ACK/NACK feedback for "b" in DL subframe index N+1 is transmitted by the UE in UL subframe index N+5, and so forth. Thus, if the UE receives PDSCH "a"-"l", the UE sends HARQ ACK/NACK response in each of corresponding UL subframes indexes N+4 through N+15.

DETAILED DESCRIPTION OF EMBODIMENTS

Previous HARQ ACK/NACK feedback implementations had attempted to provide for shorter feedback timing delays and for relatively simple HARQ protocol stacks. Such attempts, however, may not provide for improved power efficiency. Therefore, implementations that selectively power cycle UE transmission modem components to reduce the overall UE power consumption are described with reference to certain embodiments. For example, multiple HARQ ACK/NACK feedback bits are aggregated (referred to as multiple or aggregate HARQ ACK/NACK information, or simply HARQ ACK/NACK information or feedback) for a predetermined number of DL subframes, and then the feedback is transmitted in a single dedicated UL subframe, so that a transmitter and power amplifier may be temporarily turned off to reduce power consumption in the UE.

Also, in LTE advanced release version number twelve (LTE-A Rel. 12), carrier aggregation (CA) including an FDD carrier and a time-division duplexing (TDD) are suitable for certain LTE wireless networks. LTE-A Rel. 12 CA could, therefore, support HARQ ACK/NACK feedback for multiple aggregated DL carriers transmitted in one UL carrier. Thus, the present inventors recognized that when aggregated HARQ ACK/NACK feedback is to be transmitted from a TDD UL, and that feedback includes feedback for a group of DL subframes of the FDD carrier, the feedback timing for the FDD carrier should be defined according to, for example, embodiments described in this disclosure.

Additional aspects and advantages of the present disclosure will be apparent from the following detailed description of embodiments, which proceeds with reference to the aforementioned drawings.

A. Example UE Embodiment

Figure 2:
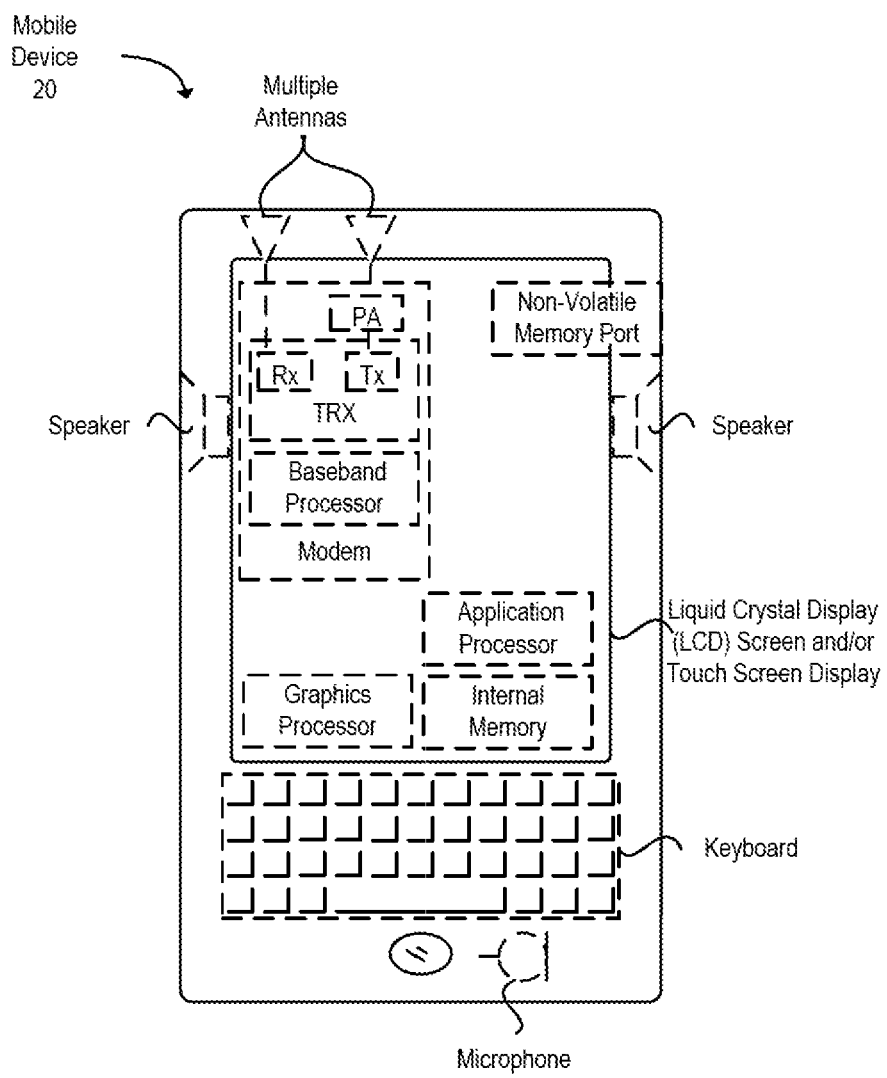
FIG. 2 is a block diagram of a UE according to one embodiment.

FIG. 2 provides an example illustration of a mobile device, commonly deployed as a UE 20, and referred to as a mobile station (MS), a mobile wireless device, a mobile communication device, a tablet, a handset, or another type of mobile wireless device.

The mobile device includes a modem configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

The modem includes a radio transceiver (TRX) having a transmitter (Tx) and a receiver (Rx); a power amplifier (PA) that includes both a duplexer and a radio frequency (RF) switch (not shown), and which is operably coupled to the Tx; and a baseband processor (BB). The mobile device may include one or more antennas, such as, for example, an Rx antenna operably coupled to the Rx and a Tx antenna operably coupled to the PA.

FIG. 2 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

B. UE Modem Power Consumption

In a typical FDD LTE UE modem platform, the following three components consume the majority of the total UE power consumption: (1) the TRX; (2) the PA; and (3) the baseband processor. But within the total power consumed in the UE modem, only part of the power consumed in the PA is ultimately propagated over the air from the UE to the eNB. Thus, the total modem power consumption is not directly proportional to the actual transmit power. For example, Table 1 lists the average current measured at the UE modem for different transmit powers. It can be seen that when the transmit power increases by 10 times (e.g., from 0 dBm to 10 dBm), the average current measured at the UE modem is only increased by roughly 10%. In other words, a small increase in measured current consumed by the three modem components mentioned previously (TRX, PA, and the baseband processor) provides a relatively large increase in transmit power.

TABLE 1

Modem current vs. Tx power

| Average Current (mA) | Transmit Power (dBm) |
|---|---|
| 242.6 | 0 |
| 266.8 | 10 |
| 407.4 | 18 |
| 649.4 | 23 |

On the other hand, UE power consumption can be reduced when the Tx and PA components are temporarily deactivated, which means turned off or not otherwise consuming normal power. Because these components are temporarily deactivated (inactive), a subsequent transmit power may need to be slightly increased to transmit any additional information stored while these components were inactive. The increased transmit power compensates for potentially degraded performance due to the larger payload size and thereby meets existing transmission standards for UEs that do not temporarily deactivate their Tx and PA components. As noted, however, the increased transmit power may be obtained with a small, disproportionate increase in modem current. Thus, the total power consumption can be reduced by temporarily deactivating the Tx and PA, which are the dominant consumers of the overall power consumption, even though the transmit power may need to be modestly increased to transmit additional information.

Figure 3:
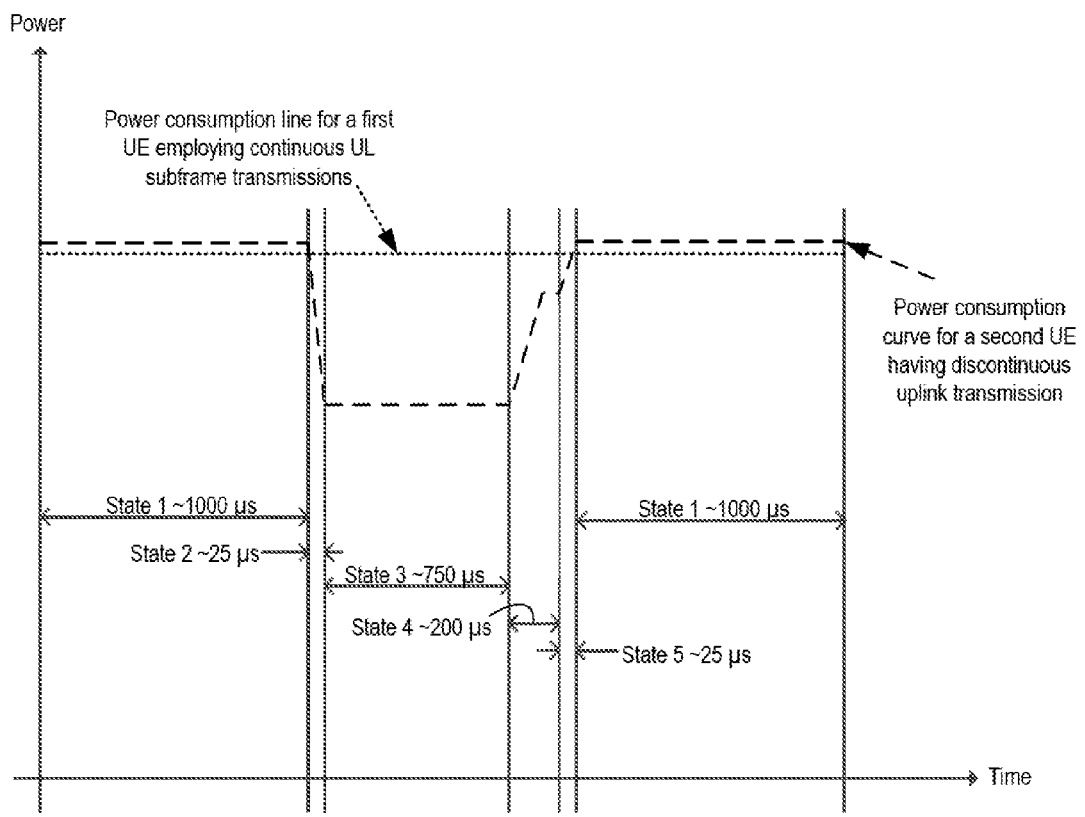
FIG. 3 is a graph showing UE modem power consumption measured for first and second UEs according to one embodiment.

FIG. 3 is a graph showing UE modem power consumption measured for first and second UEs showing, respectively, no change in power consumption of the first UE due to its lack of transitioning between several states and a power consumption curve of the second UE due to its transitioning between the several states, according to one embodiment. FIG. 3 shows power consumption for first and second UEs in a three millisecond (ms) period. The first UE is of a conventional type so it does not power cycle its Tx and PA. Therefore, the first UE power consumption line is flat because its Rx, Tx, and PA remain active throughout the 3 ms. The second UE, however, temporarily deactivates its Tx and PA, and therefore the second UE power consumption curve illustrates five operational states reflecting various active and inactive modem components.

In State 1, both the Tx and Rx component of the TRX, as well as the PA, are powered on. Powered on simply means activated, or consuming power. In certain embodiments, the second UE starts with its normal working State 1 in a first subframe.

In State 2, the Tx and the PA are powering down. This is a transitional state that shows the Tx and the PA shutting down, but in practice this state is essentially transitory and, therefore, negligible. In certain embodiments, the second UE switches off its Tx and PA at the beginning of a second subframe.

In State 3, only the Rx is powered on. Thus, the Tx and the PA are inactive (not consuming power).

In State 4, power is provided to the Tx. As explained, this is a transitional state to show activation of the Tx.

In State 5, power is provided to the PA. This is also a transitional state and it may occur contemporaneously with State 4. In fact, the States 4 and 5 may be considered to be the same state since these are simply transitional states. In one example, at the end of the second subframe, the second UE first activates the Tx and then activates the PA. Thus, the UE returns to the working State 1 in a third subframe.

The first UE power consumption line is slightly lower than that of the second UE power consumption curve during State 1 because, in that state, the second UE transmits additional information and thereby uses a higher transmit power than that of the first UE. Nevertheless, the power saved in State 3 is greater than any additional power used to transmit in State 1. Accordingly, in some embodiments, a UE can switch off its Tx and PA components (State 3) in about 50% or greater of its UL subframes, and thereby transmit data in the remaining subframes (State 1) using a higher transmit power. The switching between State 1 and State 3 is referred to herein as a power savings mode, an on/off duty cycle, or discontinuous uplink transmission. Estimates of power savings, based on UE power consumption, are provided in subsequent paragraphs herein with reference to Table 2 and Table 3.

C. Uplink Control Information (UCI) Transmission in a Single Uplink Carrier

UCI includes HARQ ACK/NACK feedback, as well as periodic channel state information (CSI). UCI can be transmitted by a UE in a physical uplink control channel (PUCCH) or in a physical uplink shared channel (PUSCH). Therefore, embodiments described in this section and throughout this disclosure encompass UEs configured to transmit UCI, HARQ ACK/NACK feedback, or CSI in either PUCCH or PUSCH.

Figure 1:
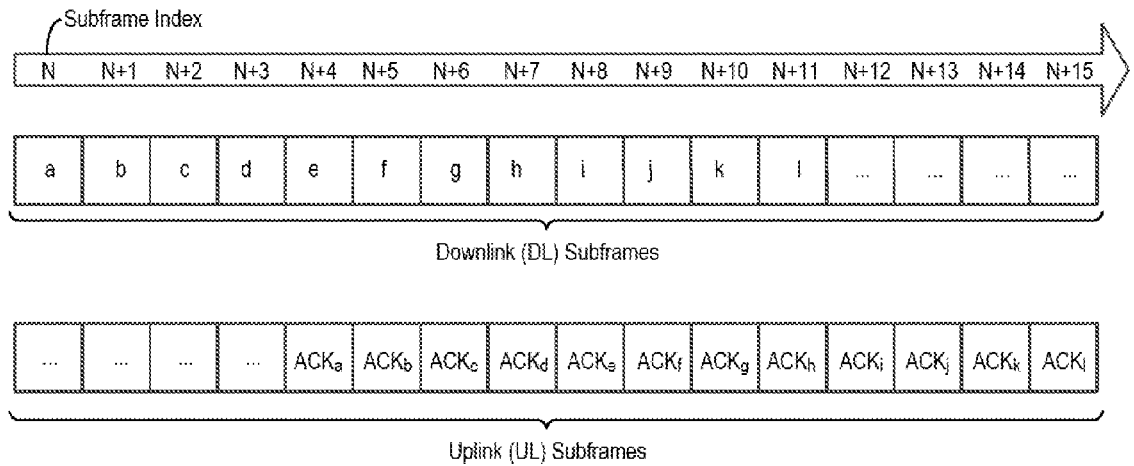
FIG. 1 is a timing diagram showing HARQ ACK/NACK feedback in LTE FDD systems, as defined in 3GPP TS 36.213.

In one typical downlink-centric wireless communication scenario, a user may be receiving video data through user datagram protocol (UDP). Accordingly, the UE may decode PUSCH in each DL subframe and transmit HARQ ACK/NACK in the corresponding UL subframes (as shown in FIG. 1). But to reduce UE power consumption as explained previously in the example of the second UE of FIG. 3, the HARQ timing protocol may be modified. Thus, in some embodiments, instead of sending HARQ ACK/NACK of one DL subframe in one corresponding UL subframe, a UE sends HARQ ACK/NACK of multiple DL subframes in one UL subframe.

Two different example options for designing HARQ ACK/NACK timing for k consecutive DL subframes in one UL subframe are set forth as follows.

Figure 4:
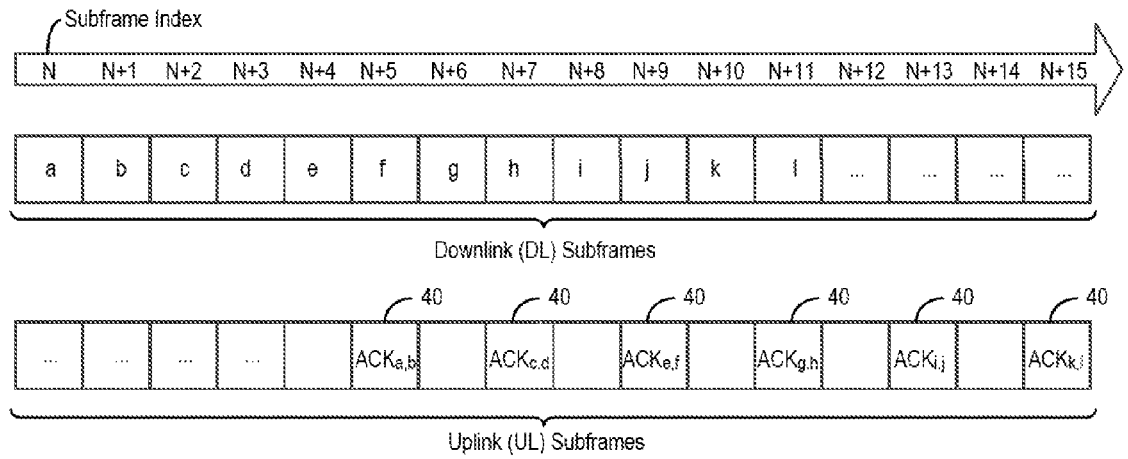
FIG. 4 is a timing diagram of discontinuous uplink transmission according to one embodiment.

Option 1: For each set of k consecutive DL subframe index values {N, N+1, . . . , N+k−1}, a UE provides a HARQ ACK/NACK in a UL subframe index value N+k+3. For example, FIG. 4 illustrates one example in which k=2.

Figure 5:
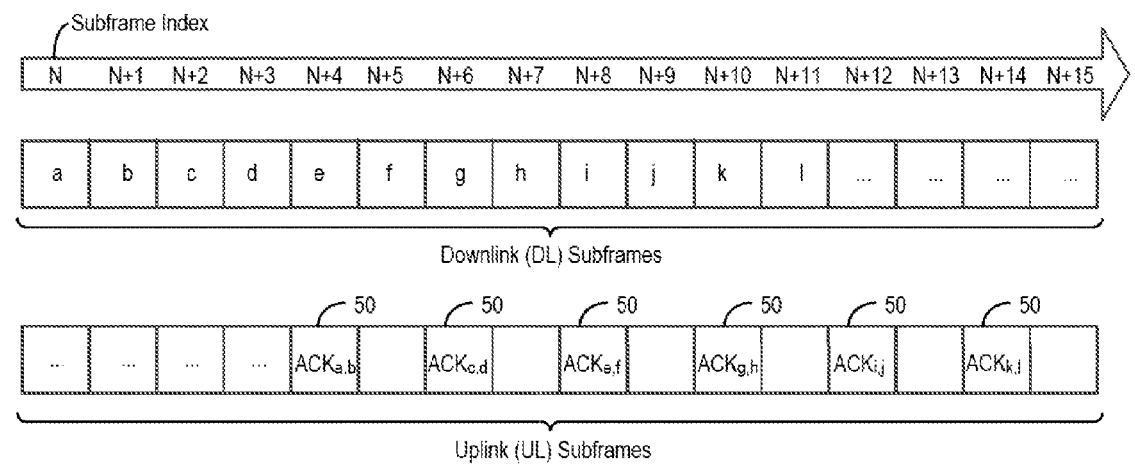
FIG. 5 is a timing diagram of discontinuous uplink transmission according to another embodiment.

Option 2: For each set of k consecutive DL subframe index values {N, N+1, . . . , N+k−1}, a UE provides a HARQ ACK/NACK in a UL subframe index value x, where x satisfies the inequality N+4≤x<N+k+3 For example, FIG. 5 illustrates one example in which k=2 and x=N+4.

One advantage of option 1 vis-à-vis option 2 is that, with option 1, UE processing time of one PDSCH transmission may satisfy existing standards. For example, with option 1, assuming the processing time for a PDSCH decoding in a subframe is 4 ms, the decoding for the PDSCH in the last DL subframe N+k−1 (i.e., N+1, assuming k=2) can be completed before the UE sends a HARQ ACK/NACK in UL subframe 40 having index value N+k+3 (N+5). But with option 2, the decoding for the PDSCH in the last DL subframe N+k−1 (i.e., N+1, assuming k=2) cannot be completed before sending HARQ ACK/NACK in UL subframe 50 having index value N+4 (assuming x=N+4). Furthermore, with option 1, for the duration of first k−1 DL subframes, the UE actually has more time budget to process the PDSCH decoding. For example, in FIG. 4, the UE transmits the first $ACK_{a,b}$ during subframe index value N+5, whereas the UE in FIG. 5 transmits the first $ACK_{a,b}$ one subframe sooner during subframe index value N+4.

On the other hand, option 1 may cause the peak DL throughput (in bits per second) to be decreased for large values of k (e.g., k>3). For example, this may occur when the eNB supports eight HARQ processes (as is specified in LTE Rel. 8), and when the eNB still has the same time budget (e.g., 4 ms processing time per DL subframe) to process DL subframes before the UE sends the aggregated HARQ ACK/NACK feedback. The large values of k cause the eNB to receive the aggregated HARQ ACK/NACK feedback for the first k−1 subframes during a time frame that is after the time frame specified in LTE Rel. 8. Nevertheless, it may still be feasible to maintain eight HARQ processes for small values of k, e.g., k=2 or 3, without degrading the peak throughput.

A technique to provide for larger values of k is to increase the total number of HARQ processes, e.g., from eight to 16. This increases the HARQ process ID bit length in all DL downlink control information (DCI) from 3 bits to 4 bits in FDD systems. Accordingly, the FDD UE also has an increased soft buffer size to accommodate the additional information. Nevertheless, in view of the fact that UEs configured for TDD already have more than eight HARQ processes, additional implementation costs may be low for FDD systems. The overall HARQ process time may be increased as well due to longer HARQ layer round trip. This may negatively impact delay-sensitive traffic, but for best effort data, additional HARQ layer delay may be tolerable.

An advantage of option 2 vis-à-vis option 1 is that option 2 typically results in fewer changes to the network side, especially for k=2. However, option 2 offers a UE less time budget to process DL subframes having HARQ feedback delay that is less than 4 ms. Furthermore, some of the x values may be infeasible for large k values, such as, for example x=N+4 and k=3.

To quantify the total power saving percentage under the aforementioned HARQ ACK/NACK feedback for k consecutive DL subframes in one UL subframe, pessimistic and optimistic estimations of power savings are provided in Table 2 and Table 3. In both comparisons, it is assumed that the power consumed by the baseband processor is 100% and all the other components consume a relative percentage of the baseband processor's power. It is expected that the baseband processor silicon will advance faster than the ratio transceiver and PA. Consequently, as the baseband processor consumes less percentage of the total power, the disclosed HARQ protocol can have more power savings in both estimates.

In the pessimistic estimation, it is assumed that the Tx power while transmitting in an (active or ON) uplink subframe will be increased by 10*log 10(k) dB to compensate for the larger number of information bits and to fulfill the existing performance standards. It is also assumed that the transitional States 2, 4, and 5 (FIG. 3) consume the same amount of power as the stable State 1. On the other hand, in the optimistic estimate, it is assumed that there is no Tx power increase in the ON uplink subframe. It is also assumed that the transitional States 2, 4, and 5 consume an average power of an entire subframe.

TABLE 2

Pessimistic estimation v. conventional 0 dBm TX power that uses slightly less PA power

|  | State | | | | | No Pow. Save Mode |
| --- | --- | --- | --- | --- | --- | --- |
|  | State 1 | State 2 | State 3 | State 4 | State 5 | N/A |
| HARQ ACK/NACK signaling of two DL subframes in one UL subframe | | | | | | |
| Tx Power (dBm) | 3 (10*log10(k = 2)) | N/A | N/A | N/A | N/A | 0 |
| BB Power (norm. factor) | 100.0% | 100.0% | 100.0% | 100.0% | 100.0% | 100.0% |
| TRX Power (norm. to BB) | 131.8% | 131.8% | 81.2% | 131.8% | 131.8% | 131.8% |
| PA Power (norm. to BB) | 16.0% | 16.0% | 0.4% | 0.4% | 16.0% | 10.8% |
| Duration (μs) | 1000.0 | 25.0 | 750.0 | 200.0 | 25.0 | 2000.0 |

TABLE 2-continued

Pessimistic estimation v. conventional 0 dBm
TX power that uses slightly less PA power

| | State | | | | | No Pow. Save Mode |
| --- | --- | --- | --- | --- | --- | --- |
| | State 1 | State 2 | State 3 | State 4 | State 5 | N/A |
| Average Power for the Duration (norm. to BB) | 221.4% | | | | | 242.6% |
| Power Saving Rate | 8.7% | | | | | 0% |
| HARQ ACK/NACK signaling of three DL subframes in one UL subframe | | | | | | |
| Tx Power (dBm) | 4.7 (10*log10(k = 3)) | N/A | N/A | N/A | N/A | 0 |
| BB Power (norm. factor) | 100.0% | 100.0% | 100.0% | 100.0% | 100.0% | 100.0% |
| TRX Power (norm. to BB) | 131.8% | 131.8% | 81.2% | 131.8% | 131.8% | 131.8% |
| PA Power (norm. to BB) | 22.0% | 22.0% | 0.4% | 0.4% | 22.0% | 10.8% |
| Duration (μs) | 1000.0 | 25.0 | 1750.0 | 200.0 | 25.0 | 3000.0 |
| Average Power for the Duration (norm. to BB) | 210.2% | | | | | 242.6% |
| Power Saving Rate | 13.3% | | | | | 0% |

It can be seen in table two that when k=2, total power savings is between 8.7% and 11.2%. For example, 8.7° k is equal to (242.6%−210.2%)/242.6%.

And when k=3, the total power savings is between 13.3% and 15.9%, which represents significant power consumption reduction.

TABLE 3

Optimistic estimation v. conventional 0 dBm TX power
that uses identical PA power as used in State 1

| | State | | | | | No Pow. Save Mode |
| --- | --- | --- | --- | --- | --- | --- |
| | State 1 | State 2 | State 3 | State 4 | State 5 | N/A |
| HARQ ACK/NACK signaling of two DL subframes in one UL subframe | | | | | | |
| Tx Power (dBm) | 0.0 | N/A | N/A | N/A | N/A | 0 |
| BB Power (norm. factor) | 100.0% | 100.0% | 100.0% | 100.0% | 100.0% | 100.0% |
| TRX Power (norm. to BB) | 131.8% | 106.5% | 81.2% | 106.5% | 106.5% | 131.8% |
| PA Power (norm. to BB) | 10.8% | 5.6% | 0.4% | 0.4% | 5.6% | 10.8% |
| Duration (μs) | 1000.0 | 25.0 | 750.0 | 200.0 | 25.0 | 2000.0 |
| Average Power for the Duration (norm. to BB) | 215.4% | | | | | 242.6% |
| Power Saving Rate | 11.2% | | | | | 0% |
| HARQ ACK/NACK signaling of three DL subframes in one UL subframe | | | | | | |
| Tx Power (dBm) | 0.0 | N/A | N/A | N/A | N/A | 0 |
| BB Power (norm. factor) | 100.0% | 100.0% | 100.0% | 100.0% | 100.0% | 100.0% |
| TRX Power (norm. to BB) | 131.8% | 106.5% | 81.2% | 106.5% | 106.5% | 131.8% |
| PA Power (norm. to BB) | 10.8% | 5.6% | 0.4% | 0.4% | 5.6% | 10.8% |
| Duration (μs) | 1000.0 | 25.0 | 1750.0 | 200.0 | 25.0 | 3000.0 |

TABLE 3-continued

Optimistic estimation v. conventional 0 dBm TX power that uses identical PA power as used in State 1

| | State | | | | | No Pow. Save Mode |
|---|---|---|---|---|---|---|
| | State 1 | State 2 | State 3 | State 4 | State 5 | N/A |
| Average Power for the Duration (norm. to BB) | 204.1% | | | | | 242.6% |
| Power Saving Rate | 15.9% | | | | | 0% |

Small cells—such as pico, femto, and RRH—have a small coverage range, so a UE may have satisfactory UL coverage when using less than its maximum transmit power (e.g., 23 dBm). In other words, the UE may not reach the maximum transmit power due to the smaller coverage in a small cell as compared to that in a macro cell. Further, UE power reduction may help the network to efficiently manage interference among the small cells. Accordingly, although the disclosed HARQ protocol timing for LTE FDD can be used in many scenarios, one suitable scenario employing the foregoing HARQ protocol timing for LTE FDD is in the case of a small cell, in which a UE need not transmit the UL signals/channels with maximum power. Because the UE may have transmit power available in such cases, the UE may use its additional transmit power for transmitting the combined HARQ ACK/NACK at a slightly increased power (compared to that used in a conventional HARQ protocol transmitting the individual HARQ ACK/NACKs corresponding to each DL subframe).

Another issue concerning UCI is that the UE usually reports CSI to the eNB using PUCCH. In order to accommodate an on/off duty cycle of 50% or greater, certain embodiments periodically report CSI during State 1. For example, CSI reporting periodicity of 3 ms, and in multiples of 3 ms, may be used in certain embodiments. Other examples could use periodicities of 4 ms, 8 ms, 16 ms, or other periods in addition to those described in table 7.2.2-1A of 3GPP TS 36.213.

D. UCI Transmission in FDD/TDD Carrier Aggregation

Figure 6:
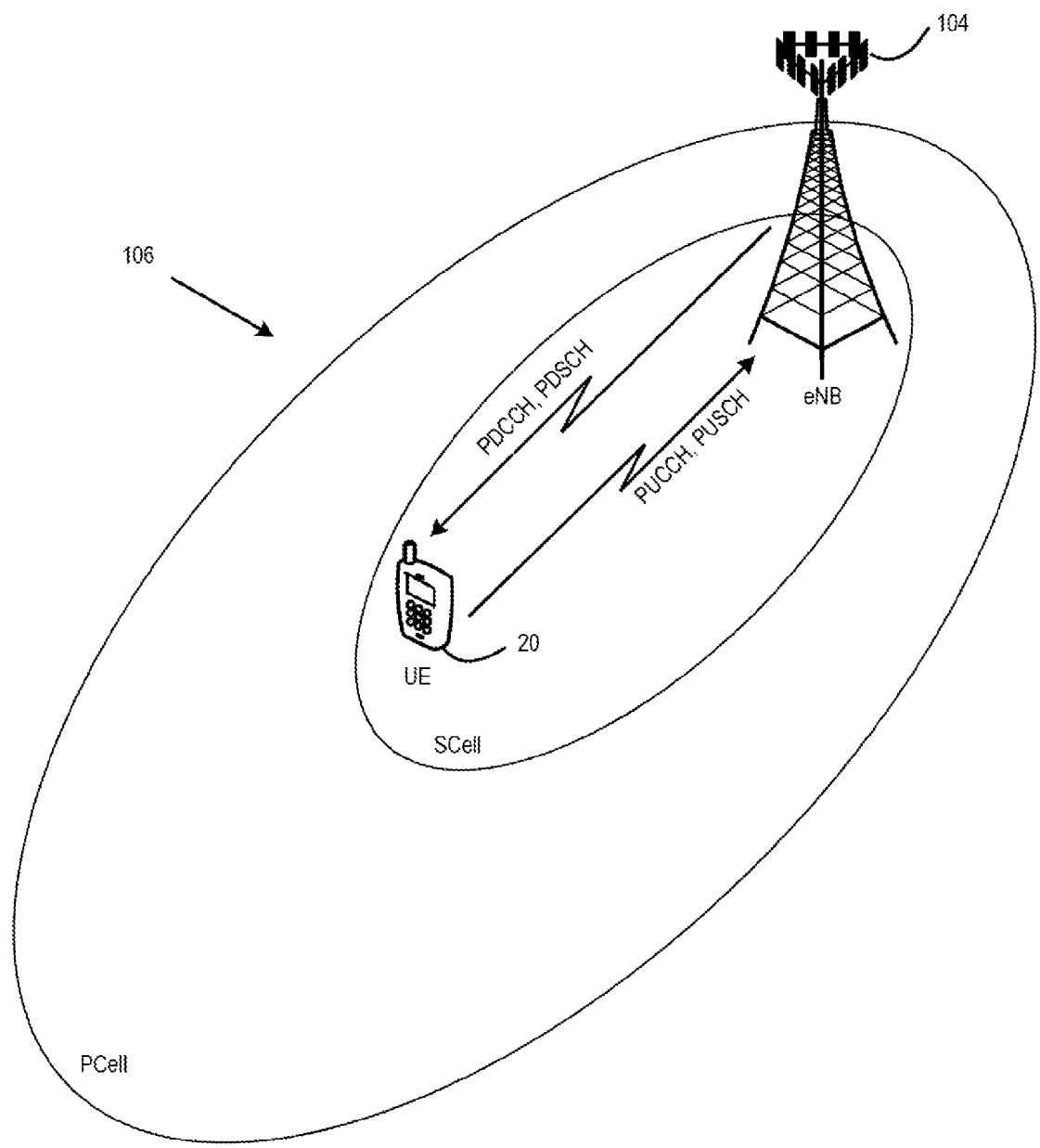
FIG. 6 is a block diagram of a wireless network supporting carrier aggregation according to certain embodiments.

FIG. 6 illustrates the UE 20 communicating with an eNB 104 in a wireless network 106, according to certain embodiments. The eNB 104 provides communication services to UEs, such as the UE 20, and in certain embodiments, eNB 104 may be associated with a set of one or more serving cells that may include macro cells and small cells deployed in carrier aggregation.

With CA, there are a number of serving cells, one for each component carrier. The coverage of the serving cells may differ—due to component carrier frequencies but also from power planning—which is useful for heterogeneous network planning. A radio resource control (RRC) connection is only handled by one cell, the primary serving cell (PCell), served by the primary component carrier (DL and UL PCC). It is also on the DL PCC that the UE receives non-access stratum (NAS) information, such as security parameters. In idle mode, the UE 20 listens to system information on the DL PCC. On the UL PCC, PUCCH is sent. The other component carriers are all referred to as secondary component carriers (DL and UL SCC), serving the secondary serving cell (SCell). SCCs are added and removed as required, while the PCC is changed only at cell handovers.

Typically, the PCell is configured with one physical downlink control channel (PDCCH) and one physical uplink control channel (PUCCH). The PCell may also have a physical downlink shared channel (PDSCH) or a physical uplink shared channel (PUSCH). An SCell may be configured with those shared channels and a PDCCH, but usually no PUCCH in conventional LTE.

Based on the analysis in section C, when the UE is operating in carrier aggregation mode with one TDD carrier and one or more FDD carriers, sending the aggregated HARQ ACK/NACK bits using the uplink of the TOO carrier may improve power efficiency. Table 10.1.3.1-1 in 3GPP TS 36.213 (ver. 10.5.0), reproduced as follows, illustrates the HARQ ACK/NACK timing for one TDD carrier.

TABLE 4

Downlink association set index K: $\{k_0, k_1, \ldots k_{M-1}\}$ for TDD

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

A HARQ ACK/NACK feedback timing using one TOO uplink for one FDD carrier is defined as follows:

TABLE 5

Downlink association set index K: $\{k_0, k_1, \ldots k_{M-1}\}$ to provide HARQ ACK/NACK feedback for FDD DL from TDD UL based on the principle of option 1 in section C

| UL-DL Config. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5, 6 | — | 4, 5 | — | — | 4, 5, 6 | — | 4, 5 |
| 1 | — | — | 5, 6, 7 | 4, 5 | — | — | — | 5, 6, 7 | 4, 5 | — |
| 1 (alt) | | | 6, 7 | 4, 5, 6 | | | | 6, 7 | 4, 5, 6 | |

TABLE 5-continued

Downlink association set index K: {$k_0, k_1, \ldots k_{M-1}$} to provide HARQ ACK/NACK feedback for FDD DL from TDD UL based on the principle of option 1 in section C

| UL-DL Config. | Subframe n | | | | | | | | | |
|---|---|---|---|---|---|---|---|---|---|---|
| | 0 | 1 | 2 | 3 | 4 | 5 | 6 | 7 | 8 | 9 |
| 2 | — | — | 4, 5, 6, 7, 8 | — | — | — | — | 4, 5, 6, 7, 8 | — | — |
| 3 | — | — | 8, 9, 10, 11 | 6, 7, 8 | 4, 5, 6 | — | — | — | — | — |
| 3 (alt) | — | — | 9, 10, 11 | 7, 8, 9 | 4, 5, 6, 7 | — | — | — | — | — |
| 4 | — | — | 8, 9, 10, 11, 12 | 4, 5, 6, 7, 8 | — | — | — | — | — | — |
| 5 | — | — | 4, 5, 6, 7, 8, 9, 10, 11, 12, 13 | — | — | — | — | — | — | — |
| 6 | — | — | 6, 7 | 5, 6 | 4, 5 | — | — | 5, 6 | 4, 5 | — |

It can be seen that the same TDD uplink subframes are chosen to feedback ACK/NACK bits for both FDD and TDD carriers in order to maximize the power saving benefit. The same principle of option 1 in section C may be chosen so that the processing time for the last DL subframe for a UL subframe can be less than 4 ms.

Alternatives for TDD configurations 1 and 3 are also listed. These two alternatives further balance the total HARQ ACK/NACK feedback bits for one TDD and one FDD carrier. For example, in the first timing of TDD configuration 1, the UE needs to feedback ACK/NACK in subframe 2 for two associated TDD downlink subframes and three associated FDD downlink subframes. Thus, in total, the UE needs to feedback for five downlink subframes in subframe 2 and three downlink subframes in subframe 3. But in the alternative timing, the UE needs to feedback for four downlink subframes in both subframe 2 and subframe 3.

E. PUCCH Repetition

Uplink PUCCH repetition is for PUCCH coverage improvement because the UE sends repetitive PUCCHs to compensate for some PUCCHs that may not be received as the distance from an eNB increases. The motivation for PUCCH repetition, however, is contradictory to discontinuous uplink transmission as described with reference to FIG. 3. Thus, in certain embodiments, PUCCH repetition is disabled in UEs with discontinuous uplink transmission, and vice versa.

F. PUSCH Aspect

To benefit further from discontinuous uplink transmission, a UE may transmit PUSCH in the uplink subframes that the UE uses to transmit PUCCH. Since the initial PUSCH or an adaptive PUSCH retransmission is scheduled by an uplink grant, the eNB can simply choose to send the uplink grant in certain downlink subframes which can only schedule PUSCH transmission in the active (State 1) uplink subframe.

For example, according to option 1, when the UE provides HARQ ACK/NACK for consecutive DL subframe index values {N, N+1, . . . , N+k−1} in UL subframe index value N+k+3, an eNB sends an uplink grant in N+k−1. Another choice is that eNB may send one uplink grant in one downlink subframe selected from the downlink subframe index values {N, N+1, . . . , N+k−1}, but the uplink grant is predetermined to schedule PUSCH transmission in uplink subframe index value N+k+3, regardless of which downlink subframes it is sent.

The current HARQ procedure for UL is based on a fixed HARQ process ID that depends on the UL subframe indices. In certain embodiments, the UE receives a HARQ process ID in a UL grant when the UE is configured for UL power saving mode (i.e., switching between State 1 and State 3). The UE then relies on the UL grant instead of using HARQ ACK/NACK to perform an equivalent HARQ feedback operation using the flexible HARQ process ID, irrespective of the UL subframe indices.

G. Network Configuration of Discontinuous Uplink Transmission

In another embodiment, the network configures a mode for HARQ ACK/NACK feedback between legacy and various aggregate feedback modes according to deployment conditions. For example, a legacy mode provides for individual UL subframe feedback for each DL subframe. This mode has higher UE power consumption due to the radio transceiver always being in the active state (e.g., State 1). To save power, the eNB may configure the UE in a second mode for aggregated feedback. As described previously, this lowers UE power consumption but reduces uplink coverage due to the higher number of information bits for feedback in the active UL subframe.

In certain embodiments, the eNB selects the first or second mode (or additional modes) based on a type of downlink traffic provided to the UE (e.g., video streaming), or based on a transmit power head room of the UE. In another embodiment, the eNB selects the mode based on remaining battery life information reported to the eNB by the UE, such as in response to the remaining battery life information indicating a battery life is lower than a predetermined threshold.

H. Example Embodiments

According to certain embodiments, a UE is for communication in an LTE wireless network, the communication being arranged as a radio frame including multiple subframes, the multiple subframes including a plurality of uplink subframes. The UE comprises: a PA; a transmitter to transmit during at least some of the plurality of uplink subframes; and circuitry configured to: deactivate the transmission component and the PA in a first portion of the plurality of uplink subframes, the first portion including at least half of the plurality of uplink subframes; and activate the transmission component and the PA to transmit information in a second portion of the plurality of uplink subframes that are different from the first portion.

In some embodiments, the multiple subframes include a plurality of downlink subframes, and the information includes multiple HARQ ACK/NACK information, the multiple HARQ ACK/NACK information corresponding to each of different ones of the plurality of downlink subframes.

In another embodiment, a power consumption level for transmission of the multiple HARQ ACK/NACK information in the second portion of the plurality of the uplink subframes is less than that used for transmissions of HARQ ACK/NACK information in each of different ones of individual uplink subframes.

In yet other embodiments, the circuitry is further configured to aggregate HARQ ACK/NACK information for a set of consecutive downlink subframes, and to transmit the aggregate HARQ ACK/NACK information in a predetermined uplink subframe of the second portion of the plurality of uplink subframes.

In further embodiments, the set of consecutive downlink subframes includes subframes {N, N+1, N+k−1}, where N is a subframe index value of the set and where k is a total number of the consecutive downlink subframes among the set. The predetermined uplink subframe includes a subframe index value of N+k+3, in one embodiment. The predetermined uplink subframe includes a subframe index value of x, where x satisfies the relationship N+4≤x<N+k+3, in another embodiment.

In another embodiment, a method of reducing power consumption for a UE in FDD communication with an eNB in a wireless network, includes: providing power, in a first operational state, to a transmitter, a receiver, and an amplifier operably coupled to the transmitter; ceasing, in a second operational state, to provide power to the transmitter and the amplifier to establish a power savings mode; and receiving, in a third operational state, information from the eNB while the UE is configured in the power savings mode.

In some embodiments of the method, the method includes ceasing, in a fourth operational state, to provide power to the receiver; and providing power to the transmitter and the amplifier.

Another embodiment includes receiving downlink subframes during the third operational state; storing for the downlink subframes, multiple HARQ ACK/NACK information; and transmitting the multiple HARQ ACK/NACK information during the fourth operational state.

In yet other embodiments, the multiple HARQ ACK/NACK information is transmitted at a higher transmission power than that used to transmit individual HARQ ACK/NACK information during multiple subframes.

In still another embodiment, the information is received from a first carrier employing TDD and from a second carrier employing ADD.

Still further embodiments include providing power to the transmitter and the amplifier in a fourth operational state; and transmitting channel state information (CSI) periodically in the fourth operational state.

Another embodiment includes providing power to the transmitter and the amplifier in a fourth operational state; and transmitting feedback of FDD downlink subframes received in the third operational state in a TDD uplink subframe transmitted in the fourth operational state.

In a further embodiment, the method includes disabling uplink PUCCH repetition in response to establishing the power savings mode. In yet another embodiment, the information includes an uplink grant to schedule a PUSCH transmission during the fourth operational state.

In yet another embodiment, the method includes receiving DCI during the third operational state, the DCI including a UL grant indicating a HARQ process identification; providing power, in a fourth operational state, to the transmitter and the amplifier in the fourth operational state; and transmitting HARQ feedback information in a UL subframe indicated by the UL grant and the HARQ process identification.

In some embodiments, an eNB establishes discontinuous uplink transmission for use in wireless communications with a UE. The eNB includes a receiver to receive HARQ ACK/NACK feedback from the UE; and circuitry configured to: select a first mode in which the eNB receives individual HARQ ACK/NACK feedback from the UE, the individual HARQ ACK/NACK feedback being facilitated by a first power consumption, a first number of information bits, and a first uplink coverage; and select a second mode in which the eNB receives aggregated HARQ ACK/NACK feedback, the aggregated HARQ ACK/NACK feedback being facilitated by a second power consumption that is lower than the first power consumption level, a second number of information bits that is greater than the first number, and a second uplink coverage that is inferior to the first uplink coverage; and configure the UE to operate in either the first or second modes.

In another embodiment of the eNB, the circuitry is further configured to select the first or second mode based on a type of downlink traffic provided to the UE.

In still another embodiment, the downlink traffic includes video streaming, and the circuitry is further configured to select the first mode based on the video streaming.

In some embodiments, the circuitry is further configured to select the first or second mode based on remaining battery life information reported to the eNB by the UE.

In still other embodiments, the circuitry is further configured to select the first or second mode in response to the remaining battery life information indicating a battery life is lower than a predetermined threshold.

In some other embodiments, the circuitry is further configured to select the second mode based on a transmit power head room of the UE.

In one embodiment, a UE communicates with an eNB in an LTE wireless network, the communication being arranged according to a radio frame including multiple subframes, the multiple subframes including a plurality of uplink subframes, includes a receiver; a transmitter to transmit during at least some of the plurality of uplink subframes; an amplifier operably coupled to the transmitter; and circuitry configured to: provide power, in a first operational state, to the transmitter, the receiver, and the amplifier; cease, in a second operational state, to provide power to the transmitter and the amplifier to establish a power savings mode; and receive, in a third operational state, information from the eNB while the UE is configured in the power savings mode.

In some embodiments, the UE is further configured to: cease, in a fourth operational state, to provide power to the receiver; and provide power to the transmitter and the amplifier.

In another embodiment, the receiver is configured to receive downlink subframes during the third operational state; the circuitry is further configured to store for the downlink subframes, multiple HARQ ACK/NACK information; and the transmitter is configured to transmit the multiple HARQ ACK/NACK information during the fourth operational state.

In still certain other embodiments of the UE, the multiple HARQ ACK/NACK information is configured to be transmitted at a higher transmission power than that used to transmit individual HARQ ACK/NACK information during multiple subframes.

In further embodiments of the UE, the information is received from a first carrier employing TDD and from a second carrier employing frequency-division duplexing.

In other embodiments, the circuitry is further configured to: provide power to the transmitter and the amplifier in a fourth operational state; and configure the transmitter to transmit CSI periodically in the fourth operational state.

In another embodiment, the circuitry is further configured to provide power to the transmitter and the amplifier in a fourth operational state; and configure the transmitter to transmit feedback of FDD downlink subframes received in the third operational state in a TDD uplink subframe transmitted in the fourth operational state.

Some embodiments include the circuitry further configured to disable uplink PUCCH repetition in response to establishing the power savings mode. In yet other embodiments, the information includes an uplink grant to schedule a PUSCH transmission during the fourth operational state.

A UE, according to one embodiment of this disclosure, includes a baseband processor; a transceiver including transmitter and receiver components; a modem including the baseband processor, transceiver, and amplifier; multiple antennas, in which a first antenna of the multiple antennas is coupled to the amplifier, and in which a second antenna of the multiple antennas is coupled to the receiver; a display touchscreen; and a keyboard.

In another embodiment, a computer-readable media including instructions that, when executed by a processor, causes a UE to: communicate in an LTE wireless network, the communication being arranged as a radio frame including multiple subframes, the multiple subframes including a plurality of uplink subframes; deactivate a transmission component and a power amplifier in a first portion of the plurality of uplink subframes, the first portion including at least half of the plurality of uplink subframes; activate the transmission component and the PA to transmit information in a second portion of the plurality of uplink subframes that are different from the first portion; and transmit the information during at least some of the second portion of the plurality of uplink subframes.

In another embodiment of the computer-readable media, the information includes HARQ ACK/NACK information, and the computer-readable media further comprises instructions to aggregate for a plurality of downlink subframes included in the multiple subframes, the HARQ ACK/NACK information corresponding to each of different ones of the plurality of downlink subframes.

Another embodiment of the computer-readable media further comprises instructions to: aggregate HARQ ACK/NACK information for a set of consecutive downlink subframes; and transmit the HARQ ACK/NACK information in a predetermined uplink subframe of the second portion of the plurality of uplink subframes.

In some embodiments, an eNB to establish discontinuous uplink transmission for use in wireless communications with a UE, includes: means to receive HARQ ACK/NACK feedback from the UE; and means to select a first mode in which the eNB receives individual HARQ ACK/NACK feedback from the UE, the individual HARQ ACK/NACK feedback being being facilitated by a first power consumption, a first number of information bits, and a first uplink coverage; and means to select a second mode in which the eNB receives aggregated HARQ ACK/NACK feedback, the aggregated HARQ ACK/NACK feedback being being facilitated by a second power consumption that is lower than the first power consumption level, a second number of information bits that is greater than the first number, and a second uplink coverage that is inferior to the first uplink coverage; and means to configure the UE to operate in either the first or second modes.

In another embodiment, the eNB further comprises means to select the first or second mode based on a type of downlink traffic provided to the UE. In some embodiments, the eNB further comprises means to select the first mode based on the downlink traffic including video streaming data.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

It will be understood by skilled persons that many changes may be made to the details of the above-described embodiments without departing from the underlying principles of the invention. The scope of the present invention should, therefore, be determined only by the following claims.

The invention claimed is:

1. A user equipment (UE) for communication in a long term evolution (LTE) wireless network, the communication being arranged as a radio frame including multiple subframes, the multiple subframes including a plurality of uplink subframes, the UE comprising:
   a power amplifier (PA);
   a transmitter to transmit during at least one of the plurality of uplink subframes; and
   circuitry configured to:
      deactivate the transmitter and the PA in a first portion of the plurality of uplink subframes, the first portion including at least half of the plurality of uplink subframes;
      activate the transmitter and the PA to transmit information in a second portion of the plurality of uplink subframes that are different from the first portion; and
      aggregate hybrid automatic repeat request (HARQ) acknowledgement and/or negative acknowledgement (ACK/NACK) information for a set of consecutive downlink subframes so as to transmit the aggregate HARQ ACK/NACK information in a predetermined uplink subframe of the second portion of the plurality of uplink subframes,
      in which the set of consecutive downlink subframes includes subframes {N, N+1, ..., N+k−1}, where N is a subframe index value of the set and where k is a total number of the consecutive downlink subframes among the set.

2. The UE of claim 1, in which the multiple subframes include a plurality of downlink subframes, and in which the information includes multiple aggregate HARQ ACK/NACK information, each one of the multiple aggregate HARQ ACK/NACK information corresponding to a different set of consecutive downlink subframes among the plurality of downlink subframes.

3. The UE of claim 2, in which a power consumption level for transmission of the multiple aggregate HARQ ACK/NACK information in the second portion of the plurality of the uplink subframes is less than that which would be used for multiple transmissions of HARQ ACK/NACK information in each of different ones of individual uplink subframes.

4. The UE of claim 1, in which the predetermined uplink subframe includes a subframe index value of N+k+3.

5. The UE of claim 1, in which the predetermined uplink subframe includes a subframe index value of x, where x satisfies the relationship $N+4 \leq x < N+k+3$.

6. The UE of claim 1, in which k equals 2.

* * * * *